Patented Jan. 8, 1946

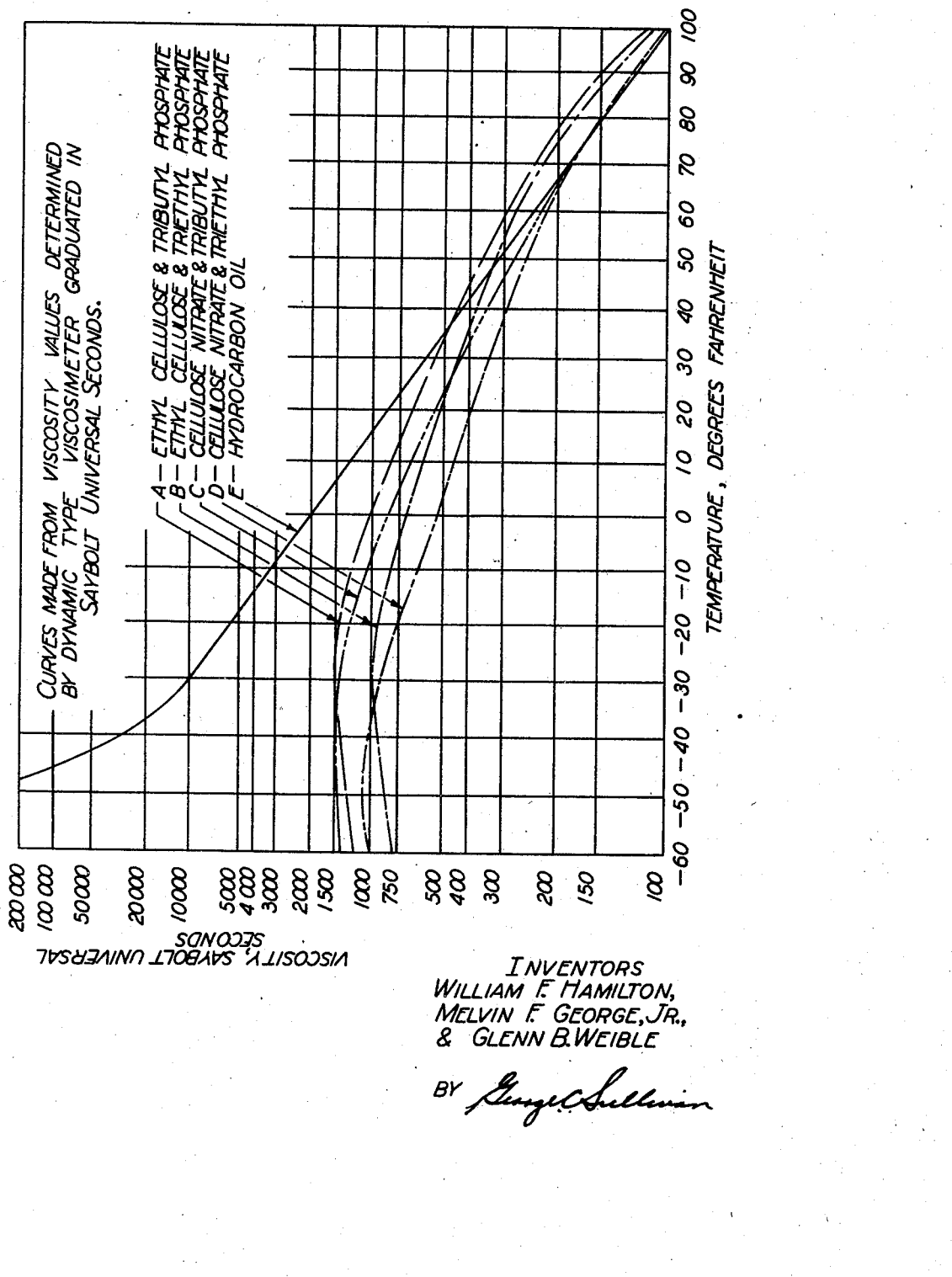

2,392,530

UNITED STATES PATENT OFFICE 2,392,530

LUBRICATING AND HYDRAULIC COMPOSITION

William F. Hamilton, Altadena, Melvin F. George, Jr., Hollywood, and Glenn B. Weible, North Hollywood, Calif., assignors to Lockheed Aircraft Corporation, Burbank, Calif.

Application February 9, 1942, Serial No. 430,112

10 Claims. (Cl. 252—56)

This invention relates to hydraulic fluids in general and more specifically to unctuous liquids having lubricating properties and adapted to be employed in hydraulic systems for transmitting force or power.

The hydraulic fluid of this invention finds its most particular application in hydraulic systems employed for the actuation of retractable landing gear, control booster systems, wheel brakes, hydraulic engine starter systems and the like mechanisms in airplanes or the like vehicles which must be subjected to extremely low temperature conditions and wide temperature differences.

For example, it is known that aircraft which are now flown at altitudes within the substratosphere at approximately 35,000 feet regardless of the latitude of the flight, enter a region where the atmospheric temperature reaches a minimum of approximately $-67°$ F. Also in arctic regions and at lower altitudes even in the temperate latitudes, comparably low temperatures are at times encountered not only by aircraft but also by ground operated automotive equipment. Under such extremely low temperature conditions measures must of necessity be taken to ensure the continued operativeness of the various hydraulic systems which such aircraft or other automotive vehicles may embody in their equipment.

Heretofore, various specially refined mineral and vegetable oils either alone or in admixture with suitable diluents have been employed in the hydraulic systems of aircraft and other automotive equipment, but these oil mixtures have heretofore all had the inherent disadvantages of high viscosity-temperature susceptibility and high freezing points which rendered them substantially useless under such low temperature conditions as hereinbefore mentioned. By way of illustration, the best mineral oil mixtures heretofore obtainable for aircraft hydraulic systems become extremely viscous at temperatures of approximately $-10°$ F. and solidify at temperatures of about $-60°$ F. These undesirable characteristics of the oils obviously render the hydraulic system employing them and subjected to such low temperature conditions, substantially inoperative. Consequently, serious and undesirable limitation has heretofore been placed upon the employment of hydraulically actuated apparatus in high altitude aircraft and other automotive equipment which must necessarily be subjected to extremely low temperature atmospheric conditions.

It is, therefore, an object of this invention to obviate the hereinbefore mentioned difficulties encountered in hydraulic systems containing the conventional fluids heretofore employed. It is an object to provide a hydraulic fluid which has a low temperature-viscosity susceptibility over the entire temperature range practically possible to be encountered. It is a further object of this invention to provide a hydraulic fluid which will have superior lubrication properties and will be less injurious to rubber, neoprene and the like materials employed in the packings and tubing of such hydraulic systems.

The invention, broadly stated, comprises a novel mixture of synthetic organic chemical substances which result in unctuous liquids having high lubricating properties and low temperature-viscosity susceptibility characteristics. The invention more specifically stated comprises a solvent mixture of a synthetic organic liquid solvent with certain synthetic resins to form oily liquids having low temperature-viscosity susceptibilities and high lubricating qualities.

Other objects, advantages and features of novelty of the invention will be evident hereinafter.

It has been discovered that oily liquids which possess viscosity characteristics and lubricating properties which render them particularly suitable for use in hydraulic systems and as lubricants under extremely low temperature conditions can in general be formed by the addition of a modicum of a normally solid, water insoluble synthetic thermoplastic resin to certain of the normally liquid, synthetic nonaqueous organic solvents.

For example it has been found that oily liquids of the above mentioned type are formed by the solution in such organic solvents of a relatively small quantity of the water-insoluble members of the thermo-plastic resins having the general formula

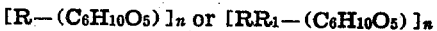

where R is an alkyl, aryl, or organic or inorganic acid radical and $R_1$ is one of the same group of radicals but different from R and where $(C_6H_{10}O_5)$ is the combined portion of the cellulose molecule or cellulose nucleus.

It has also been found that other thermo-plastic resins of the polyvinyl and acrylic types are similarly suitable.

Plastics of the polyvinyl types are those having the general formulas

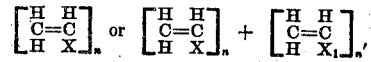

where X and $X_1$ may be different organic and inorganic acid radicals, and those of the acrylic resin types are those having the general formulas

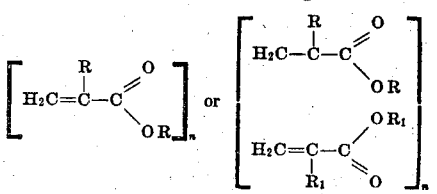

where R and $R_1$ may be hydrogen or an alkyl radical but where one or both of the $R_1$ radicals are different from the R radicals.

The organic solvents to which the beforementioned types of thermoplastic resins may be added have been found to be preferably the normally liquid low freezing point and high flash point members of the alkyl phosphates, which in general are those having from one to five carbon atoms inclusive in the alkyl radicals.

More specific examples of the preferred solvent-plastic mixtures are those containing a modicum of one or more of the water insoluble members of the hereinbefore mentioned thermo-plastic cellulose compounds such as ethyl cellulose, benzyl cellulose, cellulose nitrate, cellulose acetate or cellulose aceto-butyrate or a thermo-plastic resin of the polyvinyl or acrylic types in certain of the nonaqueous, low freezing, high flash point organic solvents such as trimethyl phosphate, triethyl phosphate, tripropyl phosphate, tributyl phosphate or triamyl phosphate or mixtures thereof. These plastic-solvent mixtures result in liquids of oily consistency having extremely flat temperature-viscosity characteristics and excellent lubricating properties. Of the said alkyl phosphates, triethyl or tributyl phosphate containing sufficient ethyl-cellulose or cellulose acetate or nitrate in solution to bring the viscosity of the mixture to approximately 100 seconds Saybolt Universal at 100° F. have been found to be particularly suitable.

Referring to Figure 1, curve A shows graphically the temperature-viscosity characteristics of a solution of 1.35 grams of ethylcellulose in 100 c. c. of tributyl phosphate, and curve E, by way of comparison, shows the temperature-viscosity characteristic of a well-known specially refined hydro-carbon oil which has heretofore been commonly employed in aircraft hydraulic systems and which has a viscosity of approximately 100 seconds Saybolt Universal at 100° F. In connection with curves A and E of Figure 1, it is to be noted that whereas the viscosity of the conventional type of oil of curve E rises steeply and apparently asymptotically to infinity at approximately −60° F. the hydraulic fluid of this invention as shown in curve A exhibits viscosity-temperature characteristics which are not only much flatter on the average throughout the whole practical range of temperatures from +100° F. to −60° F. but which are negative at temperatures below approximately −30° F.

cellulose nitrate in 100 c. c. triethylphosphate. In each case sufficient of the cellulose compound was added to the solvent to bring the viscosity of the mixture up to approximately 100 seconds Saybolt Universal at 100° F. The amount of the cellulose compounds added may be varied slightly to values above or below those herein disclosed to adjust the viscosities of the liquid mixtures to the desired minimum values at the higher temperatures. In this regard it has been found to be desirable to so adjust the viscosity to a suitable minimum value which will allow effective packing against leakage and provide adequate lubrication of the various moving parts of the hydraulic system in which the fluid is contained, and 100 seconds Saybolt Universal appears to be a satisfactory minimum value for the average system.

In cases where these fluid mixtures are used primarily as lubricants, especially in light high speed mechanisms, as hereinafter mentioned, it may be desirable to reduce the amount of cellulose compound added to the liquid alkyl phosphate in order to reduce the initial and overall average viscosity of the resultant mixture.

These cellulose-alkyl phosphate mixtures are found to have the additional advantage of exhibiting superior lubricating properties. For example, the hydraulic fluid A comprising 1.35 grams of ethylcellulose in 100 c. c. of tributylphosphate was tested in a Timken lubricating oil testing machine and found to carry a bearing load of 18,000 pounds per square inch at a rubbing speed of 400 feet per minute for one hour without breakdown and to breakdown finally at 25,000 pounds per square inch after two and a half minutes of operation. Identical tests conducted upon the Timken machine with the conventional type of hydraulic oil A resulted in the breakdown of the lubricant at a bearing pressure of 6,000 pounds per square inch at a rubbing speed of 300 feet per minute in 10 minutes. The new oil of this invention is thus seen to possess characteristics by which it may be classed as an extreme pressure lubricant.

Table No. I lists additional comparative characteristics of these fluids corresponding in composition with those of curves A to E of Figure I which indicate their suitability and superiority as hydraulic fluids:

*Table 1*

| Characteristics | Tributylphosphate | | Triethylphosphate | | Hydrocarbon oil E |
| --- | --- | --- | --- | --- | --- |
| | Ethyl-cellulose A | Cellulose nitrate C | Ethyl-cellulose B | Cellulose nitrate D | |
| Grams in 100 c. c. solvent | 1.35 | 2.5 | 2.0 | 3.5 | 34.0. |
| Gravity A. P. I.[1] | 12.1 | 12.1 | 0.2 | Less than 0 | 270. |
| Flash, ° F.—C. O. C.[2] | 300 | 305 | 275 | 285 | 980. |
| Viscosity S. U. S.[3] @ 100° F. | 98.0 | 99.8 | 98.5 | 103 | 42.6. |
| Viscosity S. U. S.[3] @ 210° F. | 42.0 | 44.2 | 42.8 | 42.5 | Solid at −60. |
| Pourpoint, ° F. | Below −109 | Below −109 | Below −109 | Below −109 | Neg. |
| Corrosion at 212° F. | Neg | Neg | Neg | Neg | |
| Swelling at 212° F.: | | | | | |
| Neoprene | 3 to 3½ | 3 to 3½ | No change | No change | 3 to 3⁵⁄₁₆. |
| Rubber | 3 to 4 | 3 to 3¼ | 3 to 3½ | 3 to 3½ | 3 to 4½. |
| Timken lub. test breakdown. | 18,000 p. s. i. for 1 hr. at 400 ft./min. | 15,000 p. s. i. for 10 min. @ 400 ft./min. | 12,000 p. s. i. for 10 min. @ 400 ft./min. | 15,000 p. s. i. for 10 min. @ 400 ft./min. | 6,000 p. s. i. for 10 min. @ 300 ft./min. |

[1] American Petroleum Institute.
[2] Cleveland Open Cup.
[3] Saybolt Universal seconds.

With further reference to Figure 1, curve B shows graphically the temperature-viscosity characteristics of a solution of 2.0 grams of ethylcellulose in 100 c. c. of triethylphosphate; curve C, 2.5 grams of cellulose nitrate in 100 c. c. of tributylphosphate; and curve D, 3.5 grams of Other liquid solvent-plastic mixtures which have been found to possess the necessary characteristics for low temperature hydraulic fluids and lubricants as hereinbefore mentioned are those comprising amyl benzene containing small quantities of a thermo-plastic polystyrene resin in solution. Typical of such fluids is one containing such a mixture in the proportions of 5 grams of polystyrene in 100 c. c. of amyl benzene which has a viscosity of approximately 100 seconds Saybolt Universal at 100° F., a flash point of 160° F. and a pourpoint below −75° F. This fluid mixture also displays negative viscosity-temperature characteristics at temperatures below about −40° F. similar to those shown in the temperature-viscosity curves of Figure 1.

While the before mentioned fluid mixtures have been described as primarily adapted to be employed in hydraulic systems under extremely low temperature conditions, the said mixtures, particularly the alkyl phosphate mixtures, are also generally useful as lubricants due to their excellent lubricating properties and they thus find important application as lubricants in mechanisms where they must operate and retain their low viscosity and high lubricating characteristics under extremely low temperature conditions. Typical of such applications are the various aircraft instruments, such as, for example, the high speed mechanism of the various well-known gyroscopic flight instruments.

Advantages of the before described fluid mixtures when used either as lubricants or hydraulic fluids resides in their low specific gravity, low temperature-viscosity susceptibility, freedom from corrosiveness, extreme pressure lubricating properties and low solvent power for rubber, neoprene and the like materials.

The foregoing is merely illustrative of the invention and is not to be limiting. The invention may include any method or composition which accomplishes the objects of the invention within the scope of the claims.

We claim:

1. A liquid composition of matter consisting essentially of a major proportion of an alkyl phosphate having from one to five carbon atoms inclusive in the alkyl radicals and a minor amount of a synthetic thermo-plastic resin of the group consisting of the class of thermo-plastic compounds having the general formula

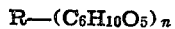

in which R is an alkyl, aryl or acid radical; the class of thermo-plastic polyvinyl resins having the general formula

in which X and $X_1$ may be the same or different acid radicals and the class of thermo-plastic acrylic resins having the general formula

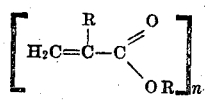

in which R is hydrogen or an alkyl radical, the amount of said synthetic thermo-plastic resin being sufficient to bring the viscosity of the mixture to approximately 100 seconds Saybolt Universal at 100° F.

2. A composition of matter according to claim 1 in which the alkyl phosphate is triethyl phosphate.

3. A composition of matter according to claim 1 in which the alkyl phosphate is tributyl phosphate.

4. A liquid composition of matter consisting essentially of a major proportion of an alkyl phosphate having from one to five carbon atoms, inclusive, in the alkyl radicals and a minor amount of the synthetic thermo-plastic resin of the class of cellulose derivative having the general formula

in which R is an alkyl, aryl or acid radical, the amount of said synthetic thermo-plastic resin being sufficient to bring the viscosity of the mixture to approximately 100 seconds Saybolt Universal at 100° F.

5. A liquid composition of matter consisting essentially of a major proportion of an alkyl phosphate having from one to five carbon atoms, inclusive, in the alkyl radicals in and a minor amount of the synthetic thermo-plastic resin of the class of polyvinyl resins having the general formula

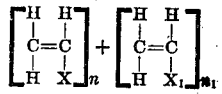

in which X and $X_1$ may be the same or different acid radicals, the amount of said synthetic thermo-plastic resin being sufficient to bring the viscosity of the mixture to approximately 100 seconds Saybolt Universal at 100° F.

6. A liquid composition of matter consisting essentially of a major proportion of an alkyl phosphate having from one to five carbon atoms, inclusive, in the alkyl radicals and a minor amount of the synthetic thermo-plastic resin of the class of acrylic resins having the general formula

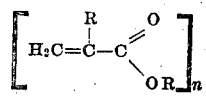

in which R is hydrogen or an alkyl radical, the amount of said synthetic thermo-plastic resin being sufficient to bring the viscosity of the mixture to approximately 100 seconds Saybolt Universal at 100° F.

7. A liquid composition of matter consisting essentially of triethyl phosphate in the major proportion and a minor amount of ethyl cellulose, the amount of said ethyl cellulose being sufficient to bring the viscosity of the mixture to approximately 100 seconds Saybolt Universal at 100° F.

8. A liquid composition of matter consisting essentially of tributyl phosphate in the major proportion and a minor amount of ethyl cellulose, the amount of said ethyl cellulose being sufficient to bring the viscosity of the mixture to approximately 100 seconds Saybolt Universal at 100° F.

9. A liquid composition of matter consisting essentially of an alkyl phosphate having from one to five carbon atoms inclusive in the alkyl radicals and from approximately 1.3 grams to approximately 3.5 grams of a thermo-plastic cellulose resin having the general formula

in which R is an alkyl, aryl or acid radical in 100 ccm. of the said alkyl phosphate.

10. A liquid composition of matter consisting essentially of triethyl phosphate in the major proportion and a minor amount of cellulose nitrate, the amount of said cellulose nitrate being sufficient to bring the viscosity of the mixture to approximately 100 seconds Saybolt Universal at 100° F.

WILLIAM F. HAMILTON.
MELVIN F. GEORGE, Jr.
GLENN B. WEIBLE.